Sept. 12, 1967   G. M. SPITLER   3,341,026
DOOR TRAY
Filed Oct. 22, 1965   2 Sheets-Sheet 1
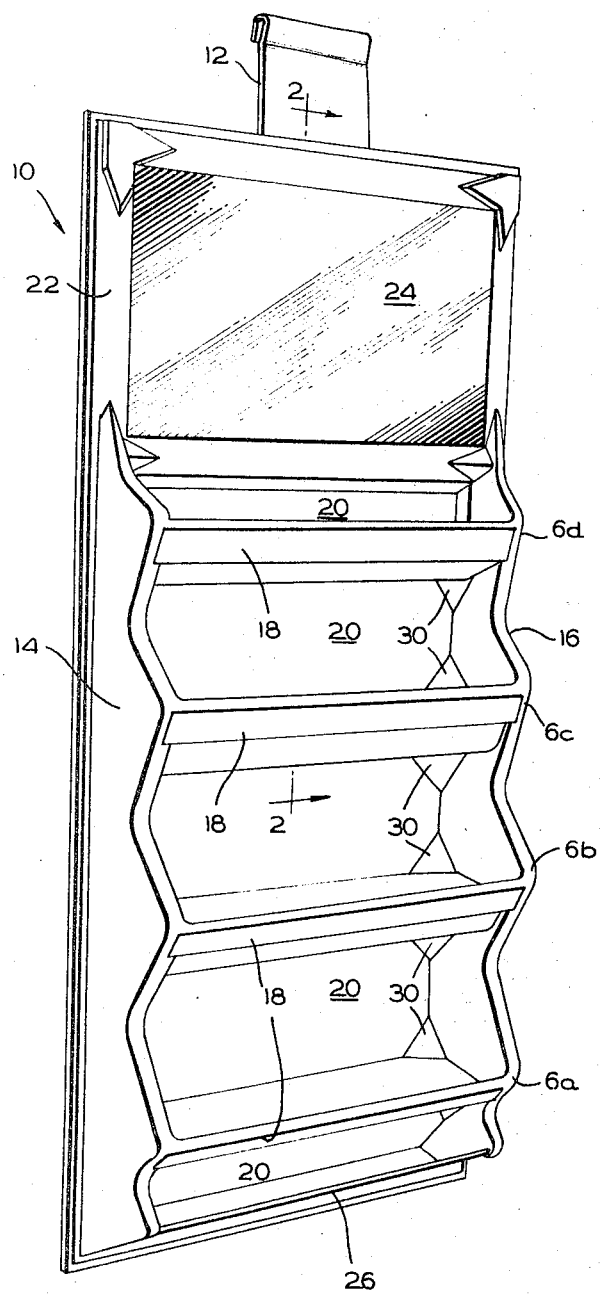
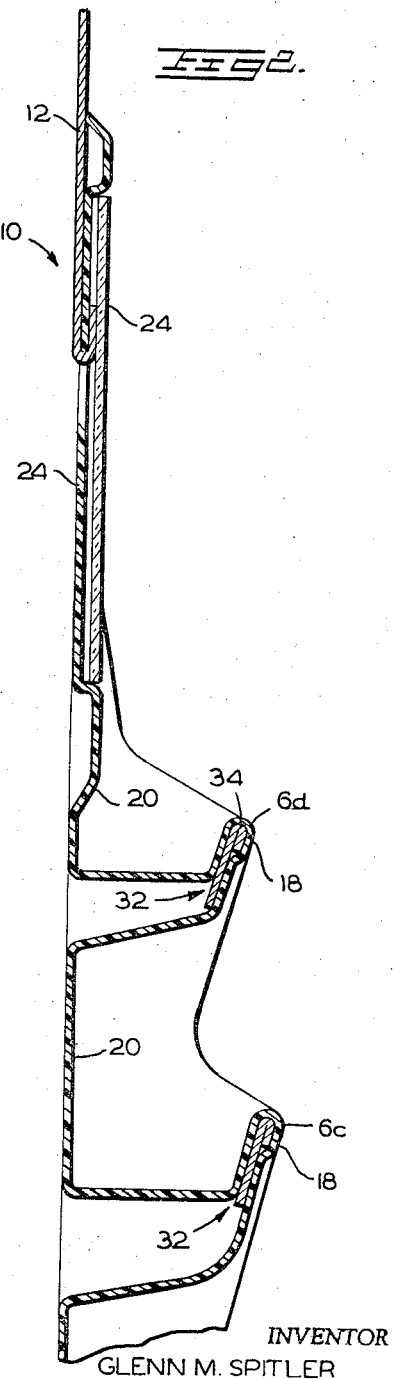
INVENTOR
GLENN M. SPITLER
BY Stowell & Stowell
ATTORNEYS Sept. 12, 1967 G. M. SPITLER 3,341,026
DOOR TRAY
Filed Oct. 22, 1965 2 Sheets-Sheet 2
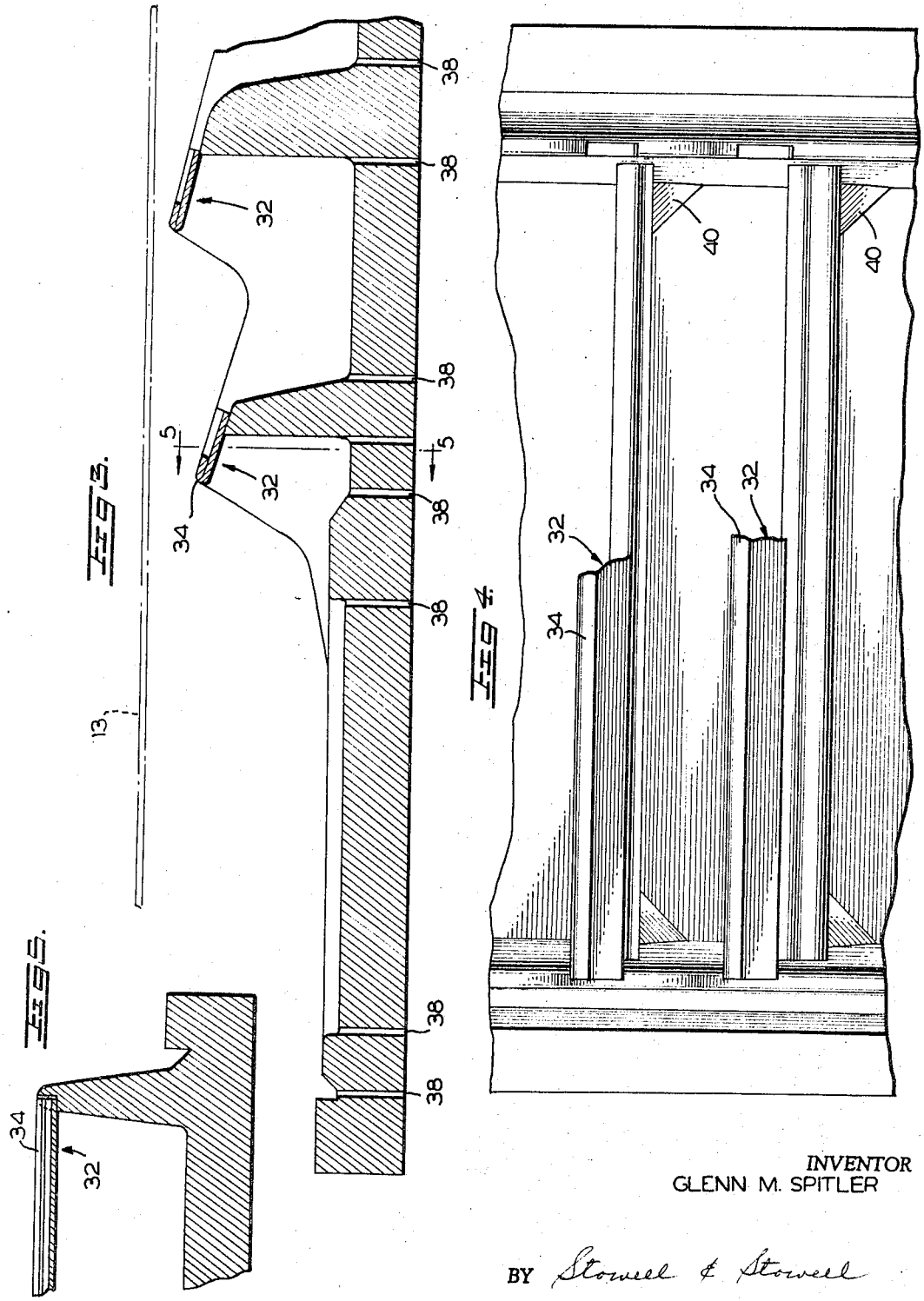
INVENTOR
GLENN M. SPITLER
BY *Stowell & Stowell*
ATTORNEYS United States Patent Office 3,341,026
Patented Sept. 12, 1967

3,341,026
DOOR TRAY
Glenn M. Spitler, 2508 Columbia Pike,
Arlington, Va. 22204
Filed Oct. 22, 1965, Ser. No. 500,660
3 Claims. (Cl. 211—88)

This invention relates to reinforced plastic door trays and to methods for making such trays.

There are many types of shelves and trays available for use inside the doors of closets, lockers and the like. For reasons of economy, plastic shelves and trays are preferred. Plastic materials have the advantage of being light in weight, but at the same time they do not have the mechanical strength of similar articles made of wood or metal.

It is therefore an object of the present invention to provide a reinforced plastic door tray, light in weight, but of adequate mechanical strength.

It is an other object of the invention to provide a novel method for the preparation of such reinforced door trays.

It is yet another object of the present invention to provide a vacuum molding method for the preparation of reinforced door trays wherein the reinforcing strip is used as a portion of the mold-forming member.

These and other advantages are obtained in a door tray wherein the shelves thereof are reinforced by a stiffening member or reinforcing strip about which the shelf is molded.

The objects and advantages of the invention are generally provided in a molded unitary plastic door tray comprising a sheet of plastic deformed to provide a pair of side panels and a plurality of vertically superposed shelves, each of said shelves including a bottom wall, a back wall and a front wall, smoothly contoured from said plastic sheet, each of said front walls being recurved in transverse section and a front wall stiffening member maintained in the fold of each of said recurved portions.

These objects are also provided by a method of vacuum forming a unitary door tray having a plurality of superposed shelves formed therein comprising forming a female mold corresponding in shape and configuration to the desired door tray, overlaying each leading edge of each shelf forming recess in the mold with a stiffening member, vacuum forming a sheet of plastic material into the recesses of said female mold and about opposite faces of said stiffening member and thereafter removing said formed sheet including the stiffening members from said female mold.

The invention will be more particularly described with reference to the illustrated embodiment thereof shown in the accompanying drawings wherein:

FIG. 1 is a perspective view of a door tray structure embodying the principles of the present invention;

FIG. 2 is a sectional view of the structure illustrated in FIGURE 1;

FIG. 3 is a fragmentary sectional view of the mold used to fabricate the structure seen in FIGURE 2;

FIG. 4 is a fragmentary elevation view with parts broken away of the structure seen in FIGURE 3; and FIG. 5 is a fragmentary detail sectional view along line 5—5 of FIG. 3.

A door tray structure of the invention is generally designated as 10. The structure is affixed to a door, usually on the interior side thereof, by means of clip 12. Any type of conventional clip or clamp may be employed to hang or attach the door tray to the door. Not shown in the drawing, the clip or clips may be attached to various locations at the rear of the door tray so as to adjust its height with respect to the floor when the tray is hung.

The improved tray also includes side walls or panels 14 and 16; front shelf walls 18, rear shelf walls 20 and a top panel portion 22. A mirror 24 may be attached by suitable means, such as by gluing, on to the panel 22. And a bar 26 or series of bars, for hanging towels, bathing suits or other damp garments thereon may be provided adjacent the lower part of the device.

The tray proper consists of a series of superposed shelves generally designated as 6a, b, c, and d formed from the walls 14, 16, 18 and 20. Weak corners in the shelves may be avoided by replacing each of the corners by means of an inwardly projecting triangular or the like structure 30.

Referring particularly to FIGURE 2, the visible front portions of the shelves are formed about a reinforcing strip 32 made of metal or other suitable material. Thin strips of a metal such as galvanized iron or aluminum are preferred because they combine a maximum of strength with a minimum of weight. The forward projecting portion 34 of each of the reinforcing strips is preferably recurved or bent back on itself for added strength. This provides extra reinforcement of the fore part of the tray which is most likely to be subject to stresses which would tend to fracture the tray. The presence of the double thickness reinforcement results in the formation and enlargement of the plastic lip or fore portion of the front wall of each shelf.

The reinforced plastic door trays of the present invention are made by a vacuum forming the plastic about a female mold. The portion of the mold about which the forward projecting portion of each of the shelves is molded is detachable from the mold proper and becomes incorporated in the plastic article as the shelf reinforcement.

FIGURE 3 is a view of a portion of the female mold showing the heat deformable plastic film overlying the mold and the reinforcing strips 32. Vacuum is applied through vacuum ports 38 thereby drawing the plastic film inwardly to conform to the shape of the mold. The molded article is allowed to cool and the vacuum broken. The completed door tray is then removed from the mold which may have been previously coated with a suitable mold release agent.

Referring to FIGURE 4, the shelf leading edge molding member 32 and the subsequent shelf reinforcement is inserted transversely into the mold with the reinforced edge portion 34 positioned in the illustrated direction. Also shown in this figure are the projecting triangular or the like blocks 40 which result in the triangular reinforced corners 30 of the completed tray.

FIGURE 5 shows the reinforcing strips 32 inserted in grooves or slots in the mold which maintain the strips in their proper location during the tray forming act. Not only do the reinforcing strips reinforce the forward edge of its shelf but they reinforce each of the complete trays in a transverse direction greatly increasing its mechanical strength. The presence of several reinforced shelves further increases the overall strength of the door tray.

The specific dimensions of the overall door tray and the nature of the reinforcing strip and the plastic material used in the preparation thereof are not critical and may be varied to suit specific requirements. A door tray suitable for use in a locker door would be about 12 inches wide, 27 inches in height and have a maximum depth of about 2 inches. The reinforcing member would preferably be made of 30 gauge sheet metal or the like about one inch wide and nine inches long. Door trays for use on a conventional closet door may be wider than those intended for use on a narrower locker door.

From the foregoing description it will be seen that the hereinabove described tray and method of making same fully accomplish the aims and objects set forth herein.

I claim:
1. A molded unitary plastic door tray comprising a sheet of plastic deformed to provide a pair of side panels and a plurality of vertically superposed shelves, each of said shelves including a bottom wall, a back wall and a front wall, smoothly contoured from said plastic sheet, each of said front walls being recurved in transverse section and a front wall stiffening member maintained in the fold of each of said recurved portions.

2. The invention defined in claim 1 including a generally flat panel section formed above the uppermost of said superposed shelves.

3. The invention defined in claim 2 including a mirror mounted on said flat panel section.

References Cited
UNITED STATES PATENTS

| | | | |
|---|---|---|---|
| 1,772,619 | 8/1930 | Warren | 211—90 |
| 2,903,315 | 9/1959 | Schory et al. | 312—214 |
| 3,179,726 | 4/1965 | Perry | 264—90 |
| 3,182,809 | 5/1965 | Getoor | 211—88 |

JOHN PETO, *Primary Examiner.*

W. D. LOULAN, *Assistant Examiner.*